June 28, 1955  T. A. FEENEY ET AL  2,711,867

FULL POWER ELECTRICAL SURFACE CONTROL SYSTEM

Filed Dec. 17, 1948  5 Sheets-Sheet 2

INVENTORS
THOMAS A. FEENEY
BY EUGENE V. BROWNE

Herbert E. Metcalf
Attorney

June 28, 1955  T. A. FEENEY ET AL  2,711,867
FULL POWER ELECTRICAL SURFACE CONTROL SYSTEM
Filed Dec. 17, 1948  5 Sheets-Sheet 3

INVENTORS
THOMAS A. FEENEY
BY EUGENE V. BROWNE
Herbert E. Metcalf
Attorney

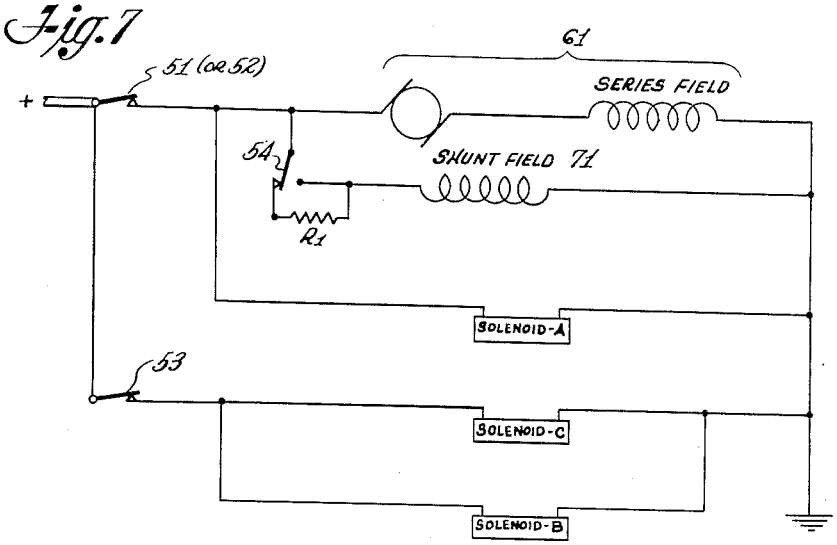
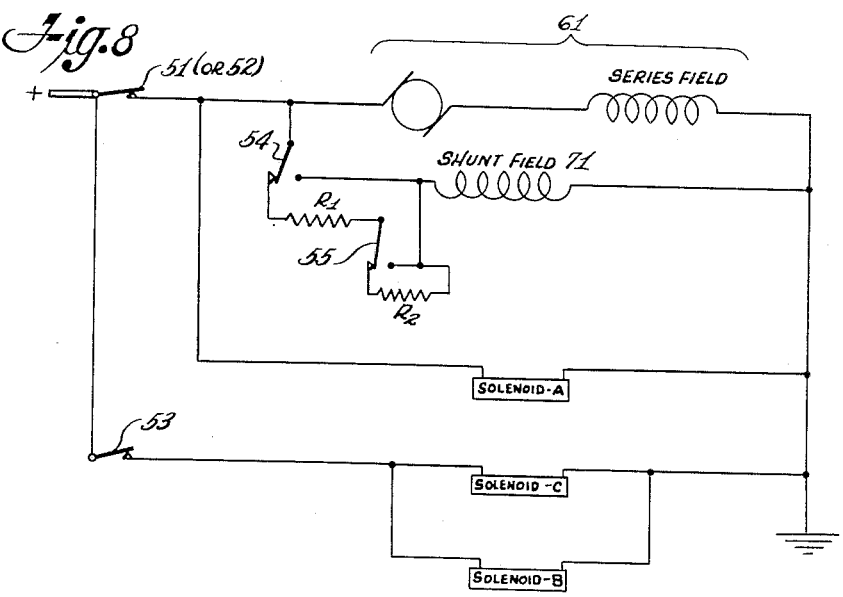

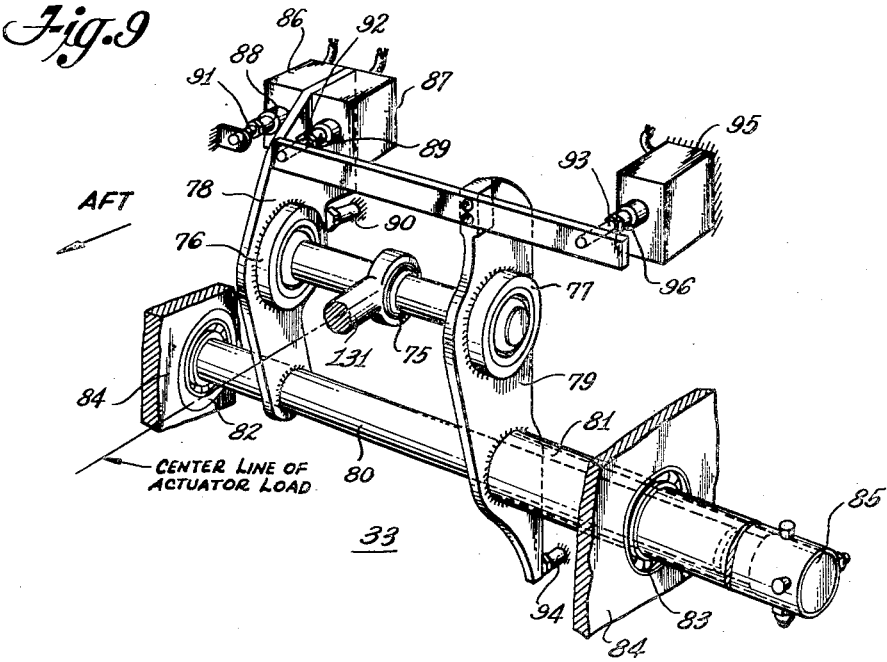

United States Patent Office 2,711,867
Patented June 28, 1955

2,711,867

FULL POWER ELECTRICAL SURFACE CONTROL SYSTEM

Thomas A. Feeney and Eugene V. Browne, Los Angeles, Calif., assignors to Northrop Aircraft, Inc., Hawthorne, Calif., a corporation of California Application December 17, 1948, Serial No. 65,806

5 Claims. (Cl. 244—83)

This invention relates to airplane control systems, and more particularly, to a full-power electrical system for pilot operation of a control surface used for changing the attitude of an airplane.

Attitude control of airplanes is accomplished by slow or rapid movement of control surfaces such as rudders, ailerons, elevators or elevons, for example. In small air planes, these surfaces are moved by direct application of pilot force to a control column or stick, and rudder pedals, which are directly connected to the respective surfaces to be controlled. The surfaces, for proper control, must move in accordance with the direction, extent, and speed of the pilot-initiated movements of the control column.

Larger airplanes, or smaller aircraft capable of high speeds, such as 500 M. P. H. or greater, require attitude control surfaces on which very high air loads are developed during movement, so that full-power operation of these surfaces is highly desirable in order to relieve the pilot of the necessity of applying high stick forces to move these surfaces. It is an object of the present invention to provide a means and method of electrically operating an attitude control surface on an airplane under full-power in response to pilot-applied control movements.

The type of operation of a control surface for attitude control of an airplane differs greatly from that by which large control surfaces are moved relatively slowly to various positions. These latter surfaces are exemplified by landing flaps for example, and it is to be understood that electrical and hydraulic motors have been heretofore utilized to move such flaps.

Attitude control, however, requires that control surface movements follow all movements of the pilot's control accurately and usually linearly, with substantially instantaneous response, and with, as far as practical, a speed closely related to the speed movement of the control column by the pilot.

Such a full-powered control has been accomplished hydraulically as has been shown, described and claimed in the copending application of Feeney, Serial No. 23,567, filed April 27, 1948, now abandoned, and it is an object of the present invention to provide a means and method of moving an attitude control surface under full-power from an electrical source, in response to pilot-initiated control movements, so that the surface will substantially follow the pilot's control movements in direction, extent and substantially in speed.

Furthermore, because the dependability of a flight control system for an airplane is of prime importance, and since the airplane's main power supply is used to operate other equipment less essential to actual flight, all of which is more or less subject to failure, especially in military aircraft, it is also often desirable to provide an auxiliary or emergency system operated from a different power supply to take over a specific control device if the main system should become inoperative. It is another object of the present invention to provide an electrical surface control system for airplanes which can be used as either a primary or secondary means of control, for example, in combination with a hydraulic system, so that one can supplant the other if the latter becomes inoperable. It is still another object of the present invention to provide a means and method of electrically operating an attitude controlling surface on an airplane, which in operation has substantially the same operating characteristics as another control system for the same surface operated from another power source, so that when a shift is made from one system to another, no significant change in operating characteristics can be detected by the airplane pilot.

The present invention, however, will be described herein as being the sole operating system for an attitude control surface, namely, a rudder, but it is to be distinctly understood that it is equally satisfactory for use as an alternate system when a means and method is provided for shifting from one system to the other. This latter means and method is no part of the present invention, it being shown, described and claimed in the copending application of Feeney and Vogel, Serial No. 42,265, filed August 3, 1948, now Patent No. 2,638,736.

One manner in which a full electrically-powered control surface operating system differs from a full-powered hydraulically operated system is that excessive air loads on a control surface can be avoided by proper relation of the hydraulic pressure as applied to the surface operating motor, such as a hydraulic cylinder and piston. The pressure and power developed can be so controlled that a maximum air load on the surface cannot be exceeded. An arrangement whereby an electrical motor would be stalled as a load limit is reached is neither practical nor desirable. It is still another object of the present invention to provide a means and method of automatically limiting the air load on an attitude control surface being operated by a fully electrically-powered control system, so that excessive air loads cannot be applied to the surface by the pilot.

In addition, electrical apparatus requires, for proper operation thereof, the use of switches to control electric current. It is another object of the present invention to provide a control switch for the operation of an electric motor connected to move an attitude control surface of an airplane that can be operated by the pilot to initiate the movement of the surface, and operated by the control surface to stop the movement of the control surface, without transmission of any air load to the pilot. It is still another object of the present invention to provide such a switch that will control the electric motor to move the surface in accordance with the extent, direction and speed of the pilot's control movements.

Stated in broad terms, the present invention comprises the mechanical operation by the pilot of a switch assembly, the switches controlling the direction, extent and speed of rotation of an actuator motor connected to an attitude control surface. Correct positioning of the control surface is accomplished by a surface operated follow-up which, through differential action, modifies the switch mechanism as the surface moves. In the event of air loads on the surface exceeding a predetermined load limit, a load-limiting device actuates switches which stop the actuator motor and allow the surface to return toward its neutral position far enough to decrease the air load below the safe maximum.

Other objects and advantages of the system as a whole and the design of its components will become apparent upon reading the description of a specific illustrated apparatus which follows, and it is to be understood that the method of the present invention is applicable to other apparatus, and is not limited in any way to the specific apparatus illustrated, as other embodiments of the invention may be adopted, within the scope of the appended claims.

Reference is made to the accompanying drawings, in which:

Figure 1A is a top sectional view showing the installation of a pair of centering switches used in the system of Figure 1, taken as indicated by the line 1A—1A in Figure 1.

Figure 7 is a schematic electrical diagram showing the same system in third speed.

Figure 8 is a schematic electrical diagram showing the same system in fourth speed.

Figure 9 is a perspective diagrammatic view showing the load limiter of the system in Figure 1.

Figure 10 is a schematic electrical diagram showing the operation of the load limiter and centering switches of the system shown in Figure 1.

General assembly

Figure 1:
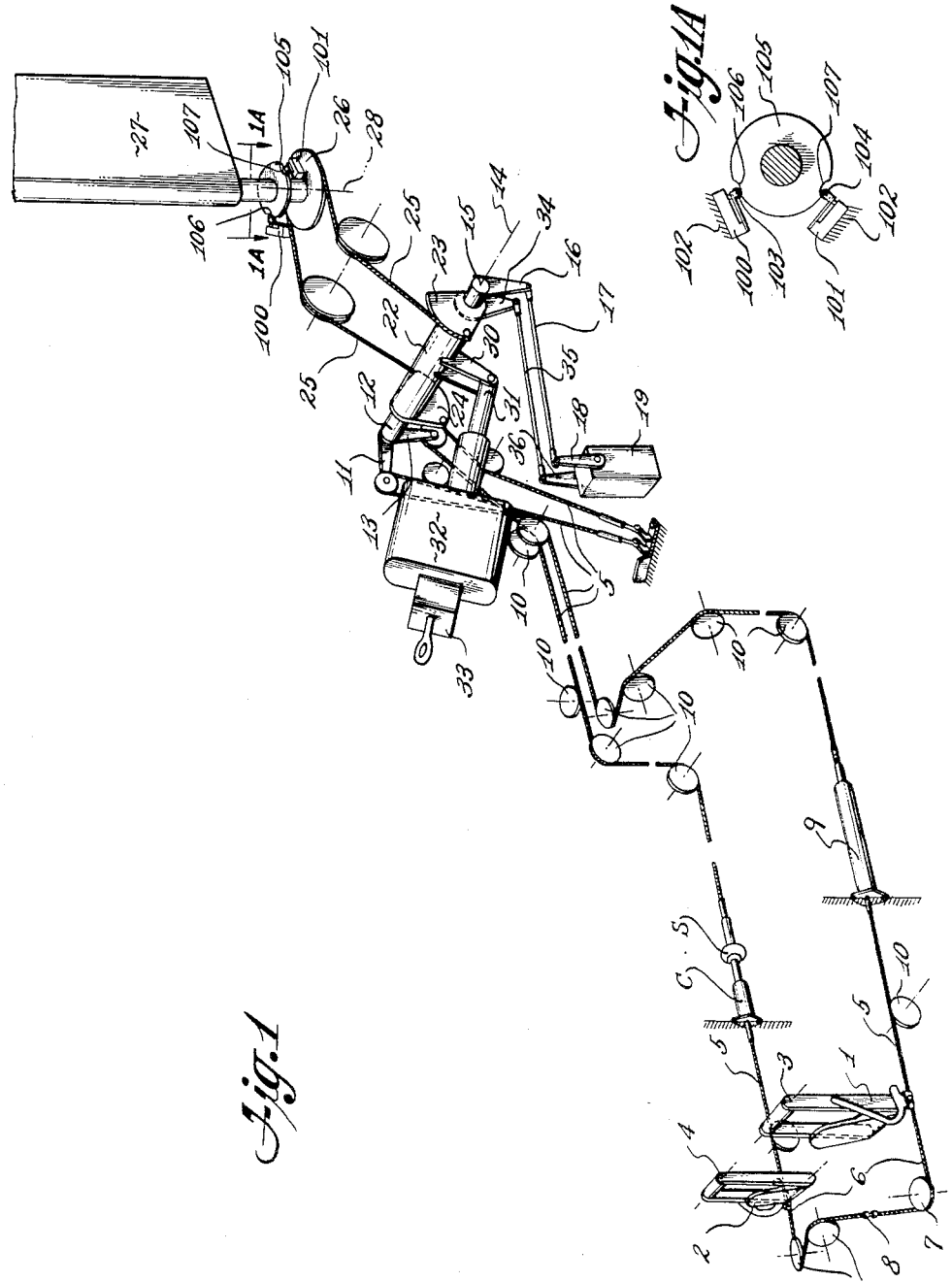
Figure 1 is a perspective diagrammatic view showing a rudder pedal system as connected to operate the rudder of an airplane by a fully-powered electrical means.

Referring first to Figure 1, two rudder pedals 1 and 2 are hinged to the airplane structure at their upper ends 3 and 4 in a position to be operated by the pilot's feet. Connected to the lower ends of the pedals 1 and 2 is a conventional control cable system consisting of a rearward cable 5 from each pedal and a forward cable 6 from each pedal. The two forward cables 6 are passed over pulleys 7 and connected together at their juncture 8.

On the left-hand rearward cable, a pedal centering spring assembly 9, fixed at its forward end to the airplane structure, is operated by movement of the rudder pedals away from neutral position in either direction to compress the enclosed spring (not shown) to provide pedal restoring forces to centralize the pedals when not operated by the pilot.

The centering spring assembly 9 acts as a pedal stop to limit the forward motion of the left-hand rudder pedal 1 to the desired amount of maximum travel. This stopping action is effected when the centering spring is compressed to its solid length. On the right-hand rearward cable, a cable casing C, similar to the centering spring assembly 9 but containing no spring, operates in cooperation with a cable stop S carried by the cable to fix the maximum forward motion of the right-hand rudder pedal 2.

The two rearward cables 5 are led over various pulleys 10 to the rear part of the airplane, where the cable from the left rudder pedal 1 is attached to pull an upper arm 11 connected to one end of a torque shaft 12, and the cable from the right rudder pedal 2 is attached to pull a lower arm 13 connected to the same end of the torque shaft 12. The torque shaft 12 is mounted transversely across the airplane and is free to rotate about a normally horizontal axis 14. Thus, fore-and-aft motion of the two rudder pedals 1 and 2 in opposite directions will cause a related rotation of the torque shaft 12.

On the torque shaft end 15 opposite the two cable attachment arms 11 and 13 is a control arm 16 rigidly connected to the shaft 12. At the outer end of this arm 16, a control rod 17 is rotatably connected. The control rod 17 runs forward, and is connected to a control lever 18 of a switch box 19. This switch box 19 will be described in detail later.

Mounted concentrically with, and outside of the torque shaft 12 is a torque tube assembly 22 carrying two tube quadrants 23 and 24, one projecting above the tube assembly 22 and the other below. The rotation of the torque shaft 12 and the tube assembly 22 is entirely independent, within the position lag of the electrical control system. A cable 25 connected over the upper tube quadrant 23 passes aft and around a rudder quadrant 26, to return and connect over the lower tube quadrant 24. The rudder quadrant 26 is attached to and operates the rudder 27 by rotating the rudder about its hinge line 28.

Also rigidly attached to the tube assembly 22 is an actuator lever 30 to which is connected a drive screw 31 of a motor-driven actuator unit 32. The actuator unit 32 is not attached directly to the aircraft structure but it transmits its load first to a load limiter 33 which in turn is bolted to the airplane. Both the actuator unit 32 and the load limiter 33 will be described later.

At one end of the tube assembly 22 a follow-up arm 34 is securely fastened to the tube so that this arm 34 is positioned adjacent to the control arm 16 attached to the inner torque shaft 12. A follow-up rod 35 connects the follow-up arm 34 to a follow-up lever 36 entering the switch box 19. From the description of the operating mechanism thus far given, it may be seen that extension or retraction of the actuator drive screw 31 will cause the rudder 27 to turn, and that the follow-up rod 35 will move the follow-up lever 36 exactly in accordance with rudder movement. Also, the control rod 17 will move exactly in accordance with rudder pedal movement.

Operating and follow-up switch mechanism

Figure 2:
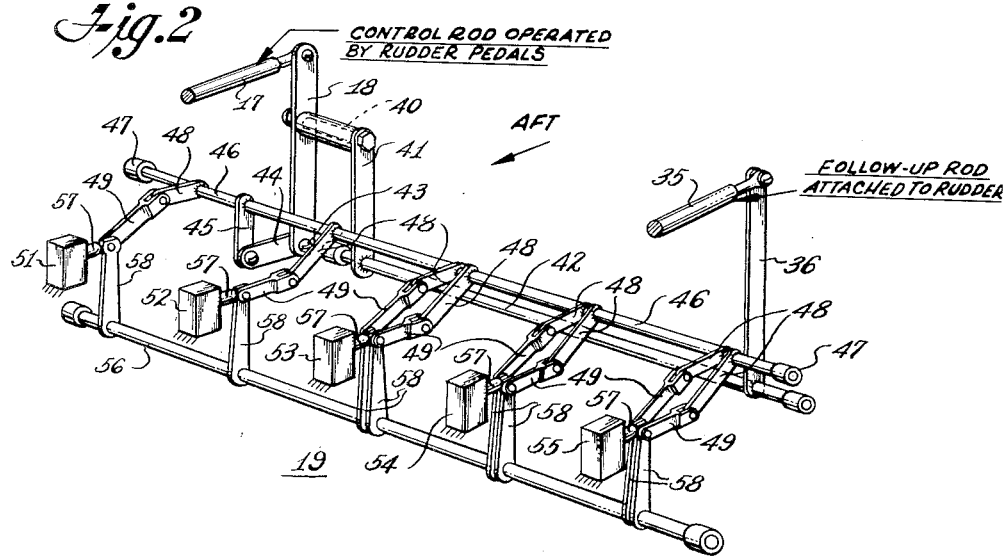
Figure 2 is a perspective diagrammatic view of the control switch box used in the system of Figure 1, viewed from the rudder end.

The construction of the switch box 19 is shown in Figure 2. The control lever 18 to which the control rod 17 is connected at the top is rotatably attached at a point approximately one-third of its length down from the top to a pin 40 extended from a sub-lever 41 which has the same motion as the follow-up lever 36, since the two are rigidly connected together at their lower ends by a connection shaft 42, which forms the axis of rotation for the follow-up lever 36. The lower end of the control lever 18 connects by a link pin 43 to a link 44 in turn pin-connected to a crank arm 45 which is welded to a control shaft 46. The control shaft 46 is mounted in stationary end bearings 47 so that it is free to rotate about its longitudinal axis. Along the length of this control shaft are welded various links 48 which are pin-connected to other links 49 whose purpose it is to effect the operation of five micro-switches 51 through 55 mounted securely in adjustable brackets (not shown) in the switch box 19. These links are arranged as follows: an idler shaft 56 is positioned in the switch box 19 so it is parallel to the control shaft 46 and located directly under the ends of the micro-switch actuators 57. Eight vertical links 58 are separately pivoted on the idler shaft 56 and extend upwardly so that their top ends are immediately adjacent to the switch actuators 57, in a position to move the actuators, one such link for the first switch 51, one link for the second switch 52, and two links each for the third 53, fourth 54, and fifth 55 switches. Connected to the top of each vertical link 58 is a connecting link 49 which is pinned to one of the welded links 48 on the control shaft 46.

When assembled, the connecting links 49 and the welded links 48 occupy the space between the tops of the vertical links 58 and the control shaft 46, as shown in Figure 2, but do not form a straight line connection. For the first switch 51, the connecting link 49 and the welded link 48 slant up toward each other, and for the second switch 52, the connecting link 49 and the welded link 48 slant down toward each other. For the three remaining switches, which have two sets of associated links instead of only one, one set for each of these switches is arranged identically with the set for the first switch 51, and the second set for each switch is arranged identically with the set for the second switch 52.

When the mechanism is assembled in this manner, and when the top of the control shaft 46 is turned toward the micro-switches, the first, third, fourth and fifth switches will be actuated by the link sets which approach a straight line and thereby force the respective switch actuators inwardly to close the circuit. When the top of the control shaft 46 is turned away from the micro-switches, the second, third, fourth and fifth switches will be actuated by the remaining link sets which took no part in the previous operation.

The position of each switch on its support bracket is carefully adjusted and then locked so that as a whole they are actuated progressively when the control shaft 46 is turned in either direction, either the first 51 or second switch 52 being closed first, depending on the direction of rotation, and then the third 53, fourth 54, and fifth 55 switches in the order named. As will be explained further later, the first and second switches 51 and 52 are direction and low speed switches, i. e., revolve the controlled motor at low speed to apply either left or right rudder, and the remaining three switches 53, 54 and 55, are speed control switches which serve to increase the speed of rudder movement with increasing angle of rotation of the control shaft 46 from the neutral position.

The control lever 18 of the switch box may pivot at either of two places, and this action makes the follow-up action possible. When the control rod 17 pushes the control lever 18 to the right as illustrated in Figure 2, for example, as when one rudder pedal 1 or 2 is depressed, the control lever 18 will pivot about its connection pin 40 with the sub-lever 41, since the rudder 27 at this time is still stationary and, as described, is directly connected to the sub-lever 41 through the follow-up rod 35, follow-up lever 36, and connection shaft 42. This action of the control lever 18 will move the lower end of the crank arm 45 to the left, causing a clockwise rotation of the control shaft 46, and thus actuating one or more micro-switches. As a result the rudder is in motion, and it is connected to push the follow-up rod 35 to the right. As this occurs, the sub-lever 41 will act on the control lever 18 to rotate it about its top pin connection to the control rod 17, since this upper point is now being held solidly by the rudder pedals. When the control lever 18 pivots in this manner, its lower end will be moved back to the right, turning the control shaft 46 counterclockwise to its original position, where the micro-switches are opened in the reverse order of their closing, and the rudder is stopped at some deflected position. If the rudder pedals are now moved back to neutral, the reverse action will take place, and the opposite directional switch will be closed to return the rudder to neutral, at which time the switches will be off again. Thus, the rudder surface is made to respond to pedal movement and assume definite positions corresponding to various pedal displacements.

*Rudder actuator unit*

Figure 3:
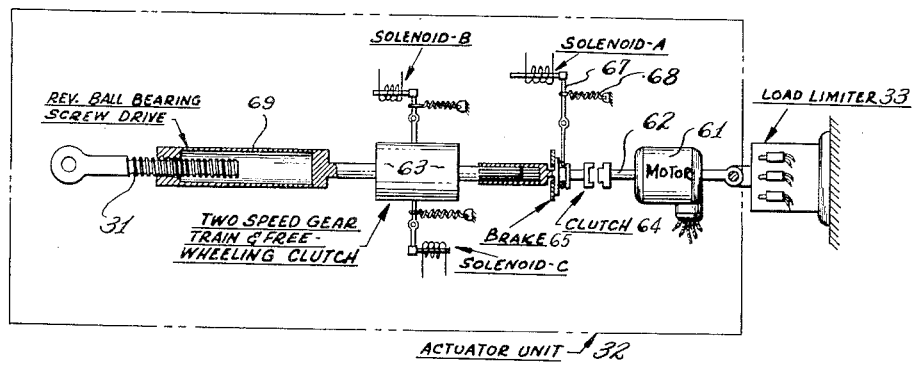
Figure 3 is a diagram showing the components of the rudder actuator unit used in the system of Figure 1.

Figure 3 diagrammatically shows the internal relationships of the components of the rudder actuator unit 32. One end of the actuator unit housing is pivotally attached to the load limiter 33. Inside the actuator unit is a compound wound D. C. reversible electric motor 61 which provides motive power to drive the rudder. The motor 61 has a shaft 62 which is connected to drive a two speed gear train 63 by a friction clutch 64. The gear train 63 is provided with a multiple-disk brake 65. Both the motor clutch 64 and the gear train brake 65 are controlled and operated simultaneously by a solenoid A whose arm 67 is acted on by a tension spring 68. When this solenoid is de-energized, the spring 68 will engage the brake 65 to apply braking force to the gear train 63, and at the same time, release the clutch 64 from the motor 61. When solenoid A is energized, its arm 67 will be magnetically pulled against the pull of the spring 68 so that the gear train brake 65 will be released and the motor clutch 64 will be engaged in driving position.

The two speed gear train is governed by solenoid B and solenoid C, both spring-loaded in the de-energized position. When neither of these two solenoids is energized, the gear train is connected to rotate the drive screw nut 69 at low speed. When both solenoids B and C are energized, the gear train is connected to rotate the drive screw nut at high speed. When only solenoid C is energized, the gear train is disconnected within itself so that drive screw nut 69 may free wheel without turning the entire gear train.

The drive screw nut 69 turns on drive screw 31 which is made to extend or retract with the rotation of drive screw nut 69, and thus drive the rudder operating quadrants 23 and 24. This drive screw and nut are of the ball bearing type and are reversible; that is, the nut portion can be revolved by axial loads on the screw portion, such as caused by air loads on the rudder 27.

Figure 4:
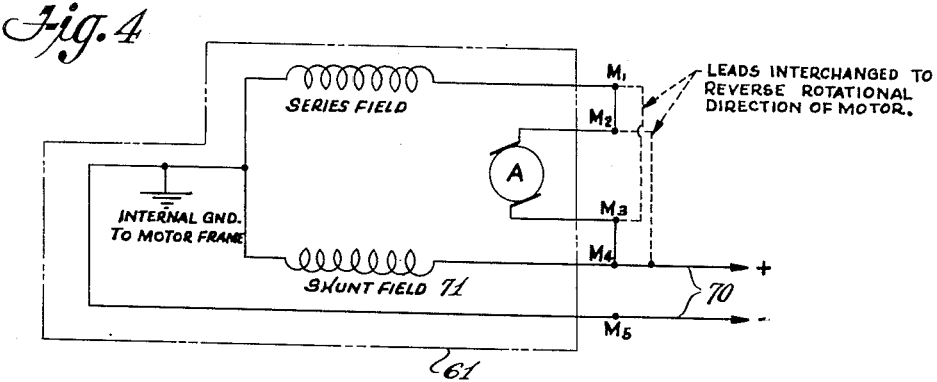
Figure 4 is an electrical diagram showing the internal wiring of the electric motor in the rudder actuator unit of Figure 3.

As shown in Figure 4, the electric motor 61 has five wire leads. Wire M5 always connects to ground. For reversing the direction of motor rotation, the connections of the armature wires M2 and M3 are reversed. Thus, for operation in one direction, wires M1 and M2 are connected together, and wires M3 and M4 are connected to the positive side of the D. C. line. For operation in the opposite direction, wires M1 and M3 are connected together, and wires M2 and M4 are connected to the positive side of the D. C. line. The proper connections are made by relays (not shown) which are operated by the first switch 51 (or 52) to be actuated in the control switch box.

In operation, when no micro-switches in the switch box 19 are closed, nothing in the actuator unit 32 is energized, the gear train brake 65 is set, and the rudder 27 is immovable.

Figure 5:
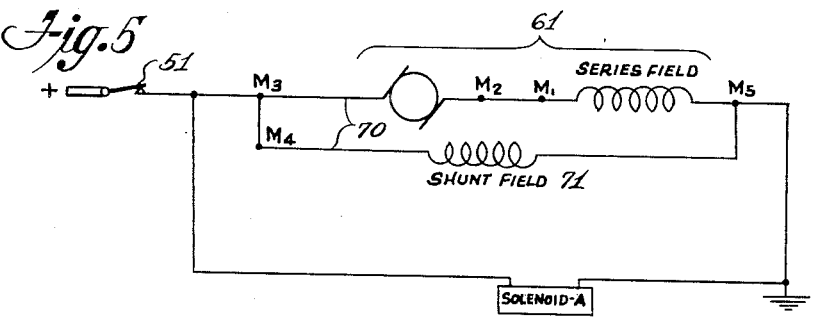
Figure 5 is a schematic electrical diagram showing the effective circuit conditions when the system of Figure 1 is operated in first speed.

When a directional switch 51 or 52 is closed, solenoid A and the motor circuit 70 are simultaneously energized, which releases the gear train brake 65 and starts the motor 61 in the proper direction to drive the rudder at low speed, approximately six degrees of angular movement per second. The effective electrical circuit for this condition is diagrammatically shown in Figure 5. When the other directional switch is closed, the leads to the brushes on motor 61 are reversed to cause the motor to run in the opposite direction.

Figure 6:
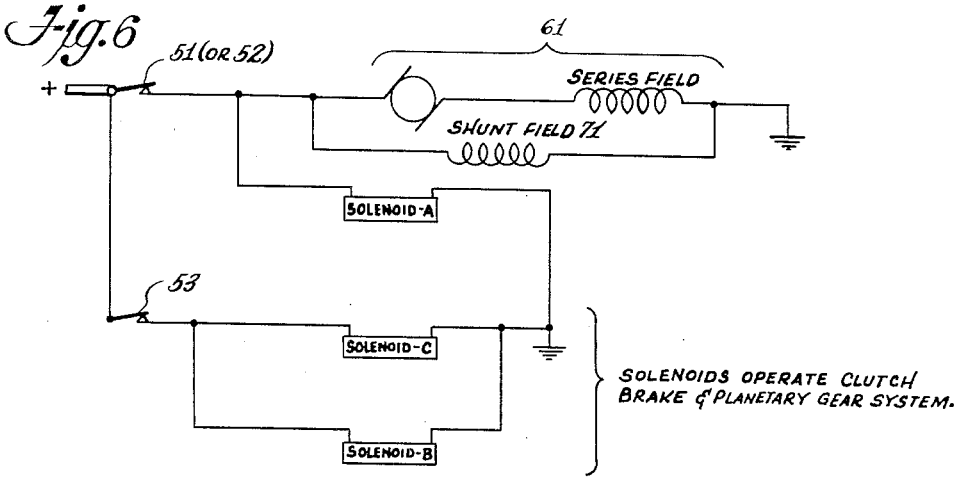
Figure 6 is a schematic electrical diagram similar to Figure 5 showing the same system in second speed.

When the second speed switch 53 is closed, in addition to the directional switch, solenoids B and C are simultaneously additionally energized, which action shifts the gear ratio of the system to move the rudder faster, at approximately fifteen degrees angular movement per second, while the motor continues to revolve at the same initial speed. The effective elctrical circuit for this condition is diagrammatically shown in Figure 6.

When the third speed switch 54 is closed, an external resistance $R_1$ is added to the shunt field 71 of the motor 61, causing the motor to turn faster, using the same gear ratio as before, as shown in Figure 7. Rudder surface velocity is now approximately twenty-four degrees per second.

When the last speed switch 55 is closed, a second additional external resistance $R_2$ is added in series with the shunt field 71, causing a still higher motor speed, as shown in Figure 8. A maximum rudder velocity of approximately thirty degrees per second is now attained.

*Load limiter*

In a high speed airplane using fully powered control systems, of which the present case is an example, very large control forces can be applied with only a small pilot effort; forces so high, in fact, as to exceed the structural load limit of that part of the airplane to which the force is applied when a surface is deflected at high airplane speed. Therefore, damage caused in this manner is prevented by utilizing a load limiting device responsive to the axial load imposed on the rudder actuator shaft in either direction.

Referring to Figures 1 and 9, the load limiter 33 is connected to the end 131 of the actuator unit 32 opposite the end where the drive screw 31 is installed. A spherical bearing fitting 75 is incorporated at this connection to allow a slight twisting motion in the load limiter 33 without causing a side thrust on the actuator unit 32. The spherical bearing 75 is pivoted between two anti-friction bearings 76 and 77, mounted in actuator support arms 78 and 79 of the load limiter 33. The first support arm 78 is welded at its lower edge to a torsion shaft 80 and the second support arm 79 is welded at its lower edge to a tube 81 which fits over and is concentric with the torsion shaft 80. Both the torsion shaft 80 and the tube 81 are mounted in fixed bearings 82 and 83 in the main support 84 of the load limiter, and they are pinned solidly together at their far end 85 only; thus, if one support arm 78 or 79 is held absolutely solid and an increasing load is applied to the other arm tending to twist it around their common axis, the tube and shaft will yield until a measurable movement of the latter arm may be obtained. This movement is used to operate a micro-switch, and it will now be shown how three such switches are used in this aspect of the present invention.

At the upper end of the first actuator support arm 78 are mounted two micro-switches 86 and 87 with their actuating plungers 88 and 89 pointing aft. This support arm 78 cannot be moved forward because it butts against an adjustable stop 90 attached solidly to the main support 84 of the load limiter assembly. Mounted directly facing the plunger 88 of the first switch 86 is another adjustable stop 91 which is rigidly mounted. If the first actuator support arm 78 is moved aft it will push the switch actuator 88 in contact with the stop 91 and cause the first switch 86 to be actuated. At the upper end of the second actuator support arm 79 are mounted two adjustable switch bolts 92 and 93 with their heads pointing forward. This second arm 79 cannot be moved aft by the actuator unit 32 because it is prevented from rotating about the tube 81 by another adjustable stop 94 which contacts the lower end of the second support arm 79. The first switch bolt 92 mentioned above is located in position to actuate the second micro-switch 87 mounted on the first actuator support arm 78, and the second switch bolt 93 is located in position to actuate a third micro-switch 95 which is mounted securely on the main support 84 of the load limiter assembly. If this second actuator support arm 79 is moved forward, it will push the second switch bolt 93 into contact with the actuating plunger 96 of the third switch 95 and operate that switch.

The two end switches 86 and 95 can, therefore, function as shut-off switches to open the actuator circuit when they are actuated by a heavy load on the actuator screw 31, either in tension or compression. A high tension load will cause the second actuator support arm 79 on the load limiter to bottom against its stop 94 and then continue to twist the first actuator support arm 78, carrying the first shut-off switch 86 into operating contact with its rigid stop 91. A high compression load will cause the reverse action—namely, bottoming of the first actuator support arm 78 against its stop 90, and twisting of the torsion shaft 80 and tube 81 until the second switch bolt 93 on the second actuator support arm 79 comes into operating contact with the second shut-off switch 95. The spherical bearing 75 mentioned above will allow a rocking movement of the actuator hinge line without jamming or damaging any parts.

It remains now to describe the operation of the center micro-switch 87 in the load limiter. This switch may conveniently be termed the free wheeling switch and its electrical action will be described later. As is evident from the drawing and the description of the mounting of the free wheeling switch 87, this one switch will be actuated in case of a high load in either direction on the actuator unit 32. This switch 87 and the switch bolt 92 which operates it are mounted, one on each of the two actuator support arms 78 and 79 respectively, and since the upper ends of these two arms twist in the same direction relative to each other regardless of the direction of the transmitted actuator load, the switch will be operated in either case. The switch bolt 92 which operates the free wheeling switch 87 is adjusted with reference to the shut-off switch adjustments so that the free wheeling switch 87 will not be actuated until after the shut-off switch 86 or 95 has been operated; in other words, a slightly higher load is required.

When assembling the load limiter, before adjustment of any switches, the actuator support arms 78 and 79 are preferably preloaded a certain amount by bringing their respective stops 90 and 94 in contact with the arms and then continuing to screw in the stops to put an initial twist into the assembly in the direction of normal twist until the desired amount of preload is obtained. The stops are then locked in this position. By preloading the limiter assembly to three-fourths or more of the load calculated to operate the shut-off switch 86 or 95, a more stable system results.

*Rudder centering system*

Another feature of the present system, when used by itself with no secondary means of control, is a rudder centering and locking device which, in cases of emergency, will allow free wheeling of the rudder to its centered position, where it is then locked. This prevents the locking of the rudder in some deflected position if the motor 61 should seize, and prevents continual flapping back and forth of the rudder if the free wheeling switch circuit should be broken. As shown in Figure 1A, two micro-switches 100 and 101 are mounted in adjustable brackets (not shown) fixed to the airplane structure 102 around the forward side of the rudder hinge 28. Each switch is provided with a roller type actuator 103 and 104 which rides, one on the left side and one on the right side of a circular cam 105 riveted to the rudder. This cam 105 contains two indents 106 and 107 positioned so that when the rudder is exactly centered, the left indent 107 will be approximately opposite the left switch actuator 104, and the right indent 106 will be approximately opposite the right switch actuator 103. In this position, both switches are open, but movement of the rudder in either direction will close one or both of the switches when the actuator thereof is pushed inwardly by the cam surface.

Operation of the load limiter, free wheeling switch and centering switches may be clearly understood by reference to the electrical diagram of Figure 10. The solid line switch positions in this drawing represent effective circuit conditions when a rudder pedal is being held full down, while a high air load has stopped deflection of the rudder by opening the shut-off switch 86 in the load limiter 33. Only one shut-off switch is shown, for clarity. The load limit shut-off switch 86 has broken the circuit of the switch box directional switch 51 and high speed relay 108 switch 53, so that the rudder is now locked at some deflected position, with nothing energized.

The dotted line switch positions in Figure 10 represent effective circuit conditions if the air load then rises enough to open the free wheeling switch 87 in the load limiter 33, while the rudder pedal is still being held down. In this position, the free wheeling switch 87 has opened the circuit of the free wheeling relay 109. This action supplies power to solenoid C in the rudder actuator unit, through one of the centering switches 101, but not allowing solenoid B to be energized. When solenoid C only is energized, a multiple-disc clutch in the actuator unit 32 is operated to disconnect the actuator drive screw nut 69 from the gear train, which is locked at present, and this action will allow the rudder and reversible drive screw 31 to free wheel toward its centered position until the air load is lowered enough to again close the free wheeling switch 87. If desired, two free wheeling switches may be incorporated rather than the one, to permit free wheeling action in each direction to be controlled by a separate switch.

Located in series with the free wheeling switch 87 is a manually operated on-off switch 110 positioned within reach of the pilot. If at any time the pilot opens this switch 110, action similar to free wheeling switch 87 operation will result, except that in this case the rudder can "free wheel" to its exact neutral position, at which time the opening of the centering switches 100 and 101 described before will de-energize solenoid C to lock the rudder in neutral. If the rudder does not return to a centered position of its own accord, it can be assisted by pilot-applied load to the rudder pedal, since a mechanical connection exists between the torque shaft 12 and the tube assembly 22 after the play allowed for electrical system position lag is taken up. In case of a failure in the electrical power supply, this centering and locking operation may still be accomplished by incorporating means to connect the airplane's storage battery with solenoid C only, through the centering switches 100 and 101 as usual.

While this system is shown and described as suitable for a primary means of control, it is obvious that the same device may be used as a secondary or emergency control system merely by omitting the centering switches 100 and 101, and connecting the wire from the dotted switch position of the free wheeling relay 109 in Figure 10 directly to solenoid C. Used as a secondary system, the pilot's switch 110 would become a dual purpose switch serving to cut out or bypass one system at the same time as cutting in or engaging the other system.

From the above description it will be noted that the rudder is fully powered and operates without transmitting any force or load-back from the rudder to the pilot. The only possible feed-back between the rudder and the pilot is through pivot pin 40 on the control lever 18, as shown in Figure 2, and this force can only be that required to move the actuators of control switches 51 through 55. As this force is smaller even than the friction load in the cable connections between control lever 18 and the rudder pedals 1 and 2, and is far smaller than the pedal restoring forces developed by centering spring assembly 9, as shown in Figure 1, no forces from the surface 27 have to be opposed by the pilot at any condition of the control system.

As this condition might easily lead to the pilot placing an air load on the rudder surface beyond its design limit, the load limiter defines the maximum air load that can be applied, and thus prevents any possibility of structural failure.

It is also to be noted that the control surface will move at a speed substantially corresponding to the speed of movement of the rudder pedals. For example, if the rudder pedals are moved slowly, the motor will run at its slowest speed by operation of switch 51 or 52, the attached control surface substantially keeping up with the pedal movement so that no additional switches are opened. If the rudder pedals are moved more rapidly, the pilot-initiated movement gets ahead of the surface movement for an instant, permitting one or more of the high speed switches 53, 54, or 55 to operate to speed up surface movement. In this respect, it can be seen that as the surface catches up with the pedal position, that the switches are traversed in a reverse order, bringing the rudder to a gradual, not abrupt, stop at its new position. Thus, while only four speeds are available, these speeds in the practical operation of the device so closely simulate a smooth response, that the pilot is not aware of the stepped speed changes nor the short time lag. The control from a pilot-airplane response point of view does not significantly differ from direct manual, or full-powered hydraulic control, for which latter control, as pointed out above, the present full-powered electrical control can be alternated without any substantial change in pilot attention.

As the system is full-power operated, the control forces applied by the pilot can be made any desired magnitude or made to vary in most any desired manner. They may be altered with ease after the airplane is flown and since the control forces can be made any desired magnitude, a control stick rather than a column and a wheel becomes possible even on large or very high speed airplanes, thus simplifying cockpit design and improving instrument visibility.

As the control cables carry only friction and switch actuating forces, and are used to transmit a signal rather than a force, the control cables may be small in diameter with resulting decrease in friction, weight, and sensitivity to temperature changes.

Trimming throughout the full range of surface travel is easily accomplished, and can be done without loss of surface power that would normally result from the displacement of a tab.

While the present invention has been described as being applied to the rudder of an airplane, it will be seen from the above description that it can equally well be applied to the full-powered control of ailerons, elevators or elevons. When applied to pitch and climb or roll control surfaces, for example, the present invention permits the use of a single surface to accomplish landing flap, dive brake, and elevator or roll control functions, since erratically varying hinge moments imposed on the surface do not cause variation of the control forces applied by the pilot.

Reference has been made herein to the pilot of the airplane as being human. Obviously, the system as herein described is ideally adapted for control by automatic piloting devices. In fact, the low and uniform control forces required for full-power operation of highly loaded control surfaces, as described herein, make the system readily adaptable for control by automatic pilots, and the same power unit can be used for both manual and auto-pilot control of the surfaces.

What is claimed is:

1. In aircraft control system, an attitude control surface to be moved, an electrically-operated actuator connected to move said surface upon energization thereof, actuator speed-changing means, a switch mechanism electrically connected to control the energization and speed-changing means of said actuator, said switch mechanism being connected to be operated in one direction by a pilot's control and in the opposite direction by said surface, to move said surface substantially in accordance with the direction, extent, and speed of movement of said pilot's control, wherein said actuator is reversible with respect to input and output ends, a load-limiting means, said actuator being connected to transmit the surface loads received by it to said load-limiting means, shut-off switches wired in series with the energization circuit of said actuator and connected to said load-limiting means to be opened to stop movement of said surface from neutral at a point where a predetermined surface hinge moment limit is reached, and wherein said actuator includes a clutch between input and output ends, a free wheeling switch in said load-limiting means, clutch-disengaging means connected to be energized by the operation of said free wheeling switch, said free wheeling switch being connected to be operable in addition to said shut-off switches at a higher surface load than that required to open said shut-off switches, to allow surface movement toward neutral without affecting subsequent normal operation of said control system, when a predetermined maximum surface hinge moment is reached, higher than said surface hinge moment limit.

2. In an aircraft rudder control system, a rudder movably attached to said aircraft, an electrically-operated actuator, reversible with respect to input and output ends, connected to move said rudder upon energization thereof, actuator speed-changing means, a switch mechanism electrically connected to control the energization and speed-changing means of said actuator, said switch mechanism having two cooperative portions, one portion being connected to be operated by a pilot's control in one direction and the other portion being connected to said rudder to move in the opposite direction, to move said rudder substantially in accordance with the direction, extent, and speed of movement of said pilot's control, load-limiting means responsive to rudder hinge loads, shut-off switches wired in the energization circuit of said actuator and connected to said load-limiting means to be opened to stop movement of said rudder in the event of dangerously high air loads on said rudder, a free wheeling switch in said load-limiting means, a clutch between input and output ends of said actuator connected to be disengaged upon operation of said free wheeling switch in the event of higher rudder loads then necessary to open said shut-off switches to allow rudder movement toward neutral to reduce said air loads without substantially affecting forces applied by said pilot or subsequent normal operation of said control system, and rudder centering means including a rudder-operated switch closed at all rudder positions except neutral and wired into said actuator to disengage said clutch upon the breaking of the circuit of said free wheeling switch, a pilot operated switch in the circuit of said free wheeling switch operable to allow said rudder to swing to neutral to open said rudder-operated switch to engage said clutch to lock said rudder in neutral, said rudder-centering means being operable by said pilot operated switch in the event of a failure in said control system or its electrical power supply.

3. In an aircraft control system, an attitude control surface to be moved, a variable speed reversible electric motor connected to move said surface, a plurality of switches connected to control the direction and speed of rotation of said motor, a pilot's control, means connecting said pilot's control to said switches to move said switches from a neutral position to move said surface, means connecting said surface to said switches to return said switches to said neutral position in accordance with said surface movement, whereby said surface is moved substantially in accordance with the direction, extent, and speed of movement of said pilot's control, and load limiting means operatively positioned to receive the reaction of surface loads against said motor, said load limiting means comprising a torsion member adapted to be twisted under high surface loads, a lever arm effectively attached to each end of said torsion member, an input element for axially transmitting said loads, one end of said input element being pivotally connected between the outer ends of said lever arms and extending substantially perpendicular thereto, stop means positioned to block movement of one of said lever arms in one direction from a neutral position and to block movement of the other lever arm in the opposite direction from said neutral, a pair of shut-off switches respectively wired in series with opposite direction operating circuits of said motor, each of said switches being respectively positioned to be actuated by movement of one of said lever arms respectively to stop said motor when the load on said control surface twists said torsion rod a predetermined amount, whereby further movement of said surface is prevented.

4. Apparatus in accordance with claim 3 wherein said means connecting said pilot's control to said switches and said means connecting said attitude control surface to said switches comprise a lever, a control rod connected between said pilot's control and one end of said lever, a follow-up rod connected between said surface and a center portion of said lever, and a switch actuating mechanism connected to the opposite end of said lever, whereby movement of said control rod by said pilot's control rotates said lever about said center portion to move said mechanism in one direction to move said attitude control surface and whereby resultant movement of said follow-up rod rotates said lever about said one end to move said mechanism in the opposite direction to stop movement of said attitude control surface in a new position in accordance with the new position of said control rod.

5. In an aircraft control system, an attitude control surface to be moved, a variable speed reversible electric motor connected to move said surface, a plurality of switches connected to control the direction and speed of rotation of said motor, a pilot's control, means connecting said pilot's control to said switches to move said switches from a neutral position to move said surface, means connecting said surface to said switches to return said switches to said neutral position in accordance with said surface movement, whereby said surface is moved substantially in accordance with the direction, extent, and speed of movement of said pilot's control, wherein said means connecting said pilot's control to said switches and said means connecting said attitude control surface to said switches comprise a lever, a control rod connected between said pilot's control and one end of said lever, a follow-up rod connected between said surface and a center portion of said lever, and a switch actuating mechanism connected to the opposite end of said lever, whereby movement of said control rod by said pilot's control rotates said lever about said center portion to move said mechanism in one direction to move said attitude control surface and whereby resultant movement of said follow-up rod rotates said lever about said one end to move said mechanism in the opposite direction to stop movement of said attitude control surface in a new position in accordance with the new position of said control rod, wherein said switches include a forward switch, a reverse switch, and at least one speed-increasing switch, all of said switches being of the momentary-contact type having spring-loaded plungers, said switch actuating mechanism comprising a control shaft, means connecting said lever to said shaft to rotate said shaft, and linkages attached to said shaft and positioned adjacent to said switch plungers to actuate first the forward switch, then the first speed-increasing switch and then the remaining speed-increasing switches, in successive order upon progressive rotation of said shaft in one direction from a neutral position where all said switches are non-actuated, and to actuate first the reverse switch, then said speed-increasing switches in the same successive order upon progressive rotation of said shaft in the opposite direction from said neutral, said actuated switches returning to said non-actuated positions in the reverse order of their actuation when said shaft returns to said neutral from either of said directions.

References Cited in the file of this patent

UNITED STATES PATENTS

| Number | Name | Date |
|---|---|---|
| 385,259 | Fiske | June 26, 1888 |
| 1,340,214 | Chiarelli | May 18, 1920 |
| 1,668,353 | Brooke | May 1, 1928 |
| 2,131,481 | O'Connor | Sept. 27, 1938 |
| 2,277,378 | Wells | Mar. 24, 1942 |
| 2,316,235 | Gost | Apr. 13, 1943 |
| 2,337,706 | Berry | Dec. 28, 1943 |
| 2,475,271 | Yardeny | July 5, 1945 |
| 2,403,101 | Lear | July 2, 1946 |
| 2,406,356 | Davidsen | Aug. 27, 1946 |
| 2,445,343 | Tyra | July 20, 1948 |
| 2,451,263 | Webb | Oct. 12, 1948 |
| 2,465,601 | Ochtman | Mar. 29, 1949 |
| 2,470,968 | Aske | May 24, 1949 |
| 2,481,776 | Osborn | Sept. 13, 1949 |
| 2,500,691 | Lear | Mar. 14, 1950 |
| 2,511,846 | Halpert | June 20, 1950 |